US008650295B2

(12) United States Patent
Chaturvedi et al.

(10) Patent No.: US 8,650,295 B2
(45) Date of Patent: *Feb. 11, 2014

(54) MANAGING NETWORK SECURITY

(71) Applicant: Brocade Communications Systems, Inc., Santa Clara, CA (US)

(72) Inventors: Animesh Chaturvedi, Fremont, CA (US); Marc Lavine, Sunnyvale, CA (US); Manan Shah, San Jose, CA (US); Ron Lau, Los Altos Hills, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,804

(22) Filed: Nov. 14, 2012

(65) Prior Publication Data

US 2013/0318617 A1    Nov. 28, 2013

Related U.S. Application Data

(63) Continuation of application No. 11/942,969, filed on Nov. 20, 2007, now Pat. No. 8,341,739.

(60) Provisional application No. 60/931,798, filed on May 24, 2007.

(51) Int. Cl.
*G06F 15/173* (2006.01)
*G06F 11/00* (2006.01)
*H04L 29/06* (2006.01)

(52) U.S. Cl.
USPC .............................. 709/225; 726/23; 713/153

(58) Field of Classification Search
USPC ........ 726/25, 23; 713/153, 201; 709/224, 225
See application file for complete search history.

(56) References Cited

U.S. PATENT DOCUMENTS

| 5,315,580 | A | 5/1994 | Phaal |
| 5,835,726 | A | 11/1998 | Shwed et al. |
| 6,243,815 | B1 | 6/2001 | Antur et al. |
| 6,473,406 | B1 | 10/2002 | Coile et al. |
| 6,480,471 | B1 | 11/2002 | VanZante et al. |
| 6,636,239 | B1 | 10/2003 | Arquie et al. |
| 6,751,198 | B1 * | 6/2004 | McPherson et al. .......... 370/252 |
| 6,772,207 | B1 | 8/2004 | Dorn et al. |

(Continued)

OTHER PUBLICATIONS

Phaal, eta l. "InMon Corporation's sFlow: A Method for Monitoring Traffic in Switched and Routed Networks" Sep. 2001' ppl 1-31.

(Continued)

*Primary Examiner* — Lynn Feild
*Assistant Examiner* — Michael A Chambers

(57) ABSTRACT

Technology for network security is disclosed. In one embodiment, a method of managing network security includes receiving sampled packets. The sampled packets represent packets being sampled from network packet traffic in at least one location in a network. The sampled packets are converted into an appropriate format for analysis to form converted packets. Moreover, the converted packets are sent to a first group including at least one security device for analysis. If an event message is generated by the at least one security device as a result of analysis of the converted packets, the event message is received from the at least one security device. Network security is evaluated based on the event message and security policies and is adjusted based on that evaluation. The method may be implemented with a network manager.

16 Claims, 6 Drawing Sheets

(56) References Cited

U.S. PATENT DOCUMENTS

| | | |
|---|---|---|
| 6,833,850 B1 | 12/2004 | Arquie et al. |
| 6,836,275 B1 | 12/2004 | Arquie et al. |
| 6,880,127 B1 | 4/2005 | Arquie |
| 6,894,972 B1 | 5/2005 | Phaal |
| 6,952,208 B1 | 10/2005 | Arquie et al. |
| 6,961,938 B1 | 11/2005 | Carwile et al. |
| 6,986,061 B1 * | 1/2006 | Kunzinger ............... 713/153 |
| 7,136,359 B1 | 11/2006 | Coile et al. |
| 7,197,545 B1 | 3/2007 | Davie |
| 7,219,300 B2 | 5/2007 | Arquie et al. |
| 7,245,587 B2 | 7/2007 | Phaal |
| 7,310,774 B1 | 12/2007 | Arquie et al. |
| 7,392,537 B2 | 6/2008 | Satomaa et al. |
| 7,523,504 B2 * | 4/2009 | Shah ....................... 726/25 |
| 7,590,648 B2 | 9/2009 | Shankar et al. |
| 8,001,605 B2 | 8/2011 | Padmanabhan et al. |
| 2002/0031134 A1 | 3/2002 | Poletto et al. |
| 2003/0070084 A1 | 4/2003 | Satomaa et al. |
| 2003/0188189 A1 * | 10/2003 | Desai et al. ............... 713/201 |
| 2004/0073800 A1 | 4/2004 | Shah et al. |
| 2004/0153574 A1 | 8/2004 | Cohen et al. |
| 2004/0193912 A1 * | 9/2004 | Li et al. .................... 713/200 |
| 2005/0027857 A1 * | 2/2005 | McPherson et al. .......... 709/224 |
| 2005/0138426 A1 | 6/2005 | Styslinger |
| 2006/0021000 A1 | 1/2006 | Li et al. |
| 2006/0258416 A1 * | 11/2006 | Crawford ................... 463/1 |
| 2007/0022468 A1 | 1/2007 | Iijima et al. |
| 2007/0044151 A1 | 2/2007 | Whitmore |
| 2007/0055789 A1 | 3/2007 | Claise et al. |
| 2007/0143851 A1 * | 6/2007 | Nicodemus et al. .......... 726/25 |
| 2007/0195958 A1 | 8/2007 | Czuchry |
| 2007/0203970 A1 | 8/2007 | Nguyen |
| 2007/0233857 A1 | 10/2007 | Cheng et al. |
| 2008/0044018 A1 | 2/2008 | Scrimsher et al. |

OTHER PUBLICATIONS

Phaal "sFlow Version 5" Jul. 2004 pp. 1-57.

Enterasys Networks that Know, Data Sheet entititled: "Enterasys Sentinel Trusted Access Manager and Trusted Access Gateway"; Lit #9014096; Jan. 2006; pp. 1-.

Enterasys Network that Know, Data Sheet entitled: "Dragon 7 Network Intrusion Detection and Prevention"; Lit #9013766-4; Jan. 2006; pp. 1-6.

Enterasys Network that Know, Data Sheet entitled: "Dragon Network Defence"; Lit #9014085; Dec. 2005; pp. 1-8.

sFlow-Making the Network Visible-www.sflow.org; Copyright 2003; "Traffic Monitoring using sFlow" 5 Pages.

InMon Corp. Internet Monitoring; "Using sFlow Accuracy and Billing" Copyright 2004; 3 Pages.

InMon Corp. Internet Monitoring; "Using sFlow and InMon Traffic Server for Intrusion Detection and other Security Applications" Copyright 2001; 4 Page.

InMon Traffic Sentinel; "Complete Network Visibility and Control" www.inmon.com; 2 pages.

Reves, et al. "Traffic Monitoring with Packet-Based Sampling for Defense Against Security Threats" 9 Pages.

InMon Corp. Internet Monitoring; Traffuc Monitoring in a Switched Environment Copyright 2001; 7 Pages.

* cited by examiner

MANAGING NETWORK SECURITY

CROSS REFERENCE TO RELATED APPLICATIONS

This application is a continuation of and claims priority to and the benefit of the U.S. application Ser. No. 11/942,969, entitled MANAGING NETWORK SECURITY," with filing date of Nov. 20, 2007, which is herein incorporated by reference in its entirety; which claims priority to and the benefit of U.S. Provisional Application No. 60/931,798, with filing date May 24, 2007, which is herein incorporated by reference in its entirety.

BACKGROUND

1. Field

Embodiments generally relate to networks. More particularly, embodiments relate to managing network security.

2. Related Art

The development of networks has introduced new applications to the computing environment and has enabled greater access to information. While the vast majority of activity on networks has a legitimate and harmless purpose, there is activity having a malicious, harmful, or illegitimate purpose. A general role of network security is to eliminate and address the malicious, harmful, or illegitimate activity but minimize the impact on legitimate and harmless activity.

There are many different approaches to network security. These different approaches may be characterized by factors such as complexity, cost, effectiveness, scalability, speed, and adaptability to network packet traffic variations. Each approach tries to optimize several of these factors and has its limitations. One approach (inline approach) focuses on inserting a security device in a particular network packet traffic path and analyzing each network packet passing through the particular network packet traffic path. This approach is costly since many high-performance security devices have to be deployed in the network. Moreover, this approach is not scalable due to its cost and complexity.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Technology for network security is disclosed. In one embodiment, a method of managing network security includes receiving sampled packets. The sampled packets represent packets being sampled from network packet traffic in at least one location in a network. A sampled packet may include a portion of the packet or may include the entire packet. Moreover, the sampled packet may include additional information. The sampled packets are converted into an appropriate format for analysis to form converted packets. Moreover, the converted packets are sent to a first group including at least one security device for analysis. If an event message is generated by the at least one security device as a result of analysis of the converted packets, the event message is received from the at least one security device. Network security is evaluated based on the event message and security policies and is adjusted based on that evaluation. The method may be implemented with a network manager.

In another embodiment, a method of managing network security includes sampling network packet traffic in at least one location in a network to form sampled packets. These sampled packets are sent to a network manager. The network manager may utilize a security device. Security adjustment information is received from the network manager. Security adjustment is implemented based on the security adjustment information. In embodiments, the at least one location in the network is in a network device such as a network switch.

BRIEF DESCRIPTION OF THE DRAWINGS

The accompanying drawings, which are incorporated in and form a part of this specification, illustrate embodiments, together with the description, serve to explain the principles of the present invention.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

As described above, factors such as complexity, cost, effectiveness, scalability, speed, and adaptability to network packet traffic variations characterize network security approaches. In accordance with various embodiments, a network security approach, which is characterized by its closed-loop aspect, is described. That is, this network security approach focuses on gathering network packet information and managing network security without interfering or interrupting network packet traffic paths of the network. As a result, various benefits are achieved such as reduction in complexity, reduction in cost, greater scalability, and greater adaptability.

Figure 1A:
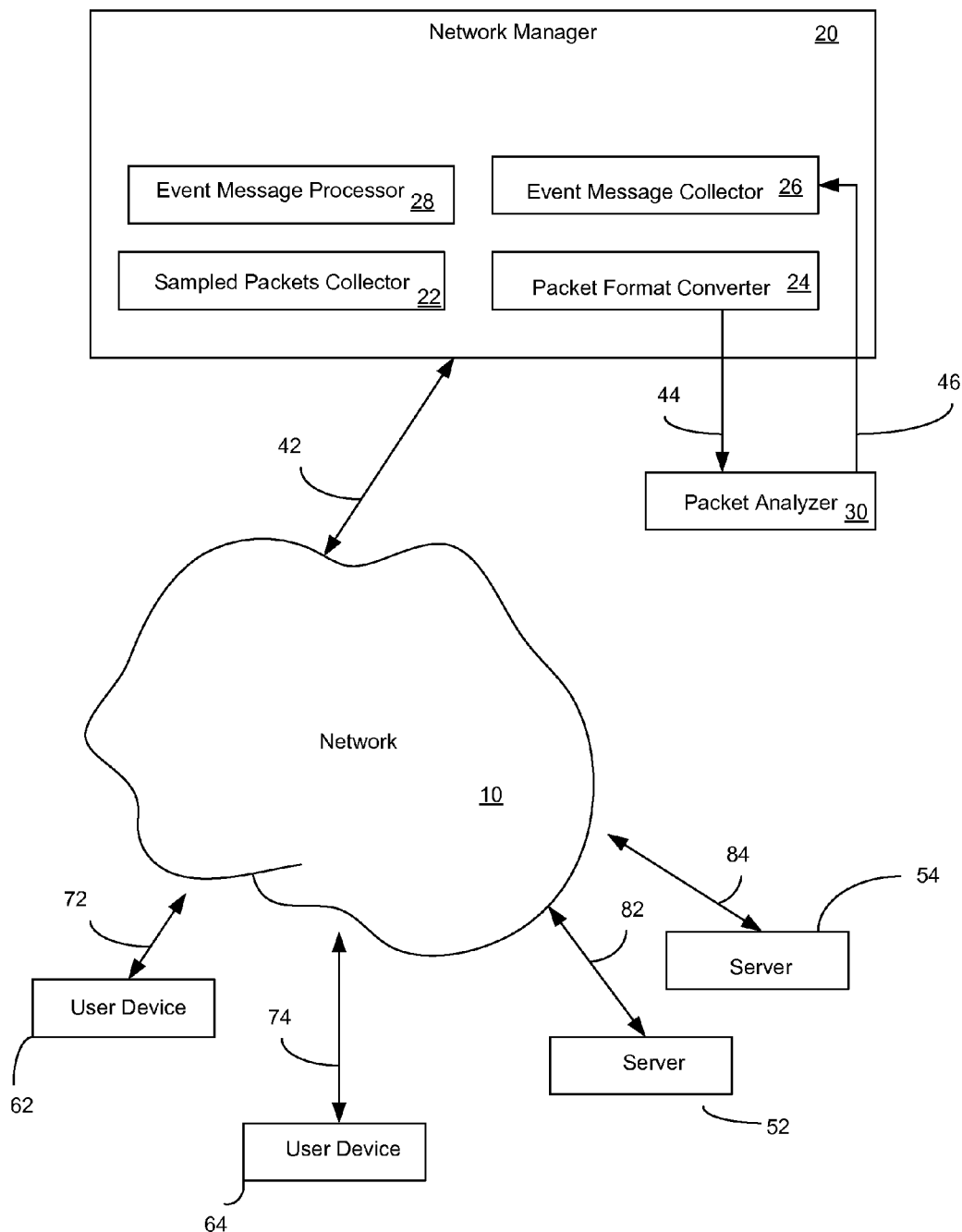
FIG. 1A illustrates a network environment in which to manage network security in accordance with various embodiments.

FIG. 1A illustrates a network environment 100 in which to manage network security in accordance with various embodiments. As depicted in FIG. 1A, the network environment 100 may include a network 10, a network manager 20, and a packet analyzer 30. The packet analyzer 30 is a security device. In an embodiment, the network environment 100 may include numerous packet analyzers and different types of security devices. The network environment 100 may further have one or more user devices 62 and 64 coupled to the network 10 via connections 72 and 74, respectively. Also, the network environment 100 may have one or more servers 52 and 54 coupled to the network 10 via connections 82 and 84, respectively.

The network manager 20 is coupled to the network 10 via connection 42 and manages network devices (FIG. 2) and network security of the network 10. The goal is to prevent and eliminate malicious, harmful, or illegitimate activity (e.g., by user devices 62 and 64 or by servers 52 and 54) and protect the legitimate and harmless activity by user devices 62 and 64 and servers 52 and 54. The network devices may be network switches, network routers, network traffic controllers, or any other type of wired or wireless network device. In an embodiment, the network manager 20 includes a sampled packets collector 22, a packet format converter 24, an event message collector 26, and an event message processor 28. The sampled packets collector 22 receives sampled packets via connection 42. As will be explained below, the sampled packets are sent by at least one network device of the network 10. The sampled packets represent packets being sampled from network packet traffic in at least one location in the network 10. A sampled packet may include a portion of the packet or may include the entire packet. Moreover, the sampled packet may include additional information, such as the address of the network device where the sample was taken and the ports through which the packet was received and transmitted.

Continuing, the packet format converter 24 converts sampled packets into an appropriate format for analysis to form converted packets and sends the converted packets to the packet analyzer 30 (or security device) via connection 44. The packet format converter 24 may send the converted packets to numerous packet analyzers. Additionally, the converted packets may be sent to different types of security devices. Some of these security devices may require the packet format converter 24 to perform different format conversions on the sampled packets. In an embodiment, the packet format converter 24 converts the sampled packets into a PCAP (packet capture) file that may represent the network packets in a similar format to that used when they are transmitted through the network 10, and is used by various security devices such as packet analyzers.

Further, the event message collector 26 receives security-type event messages based on analysis of the converted packets from the packet analyzer 30 via connection 46. The event message collector 26 may receive event messages based on analysis of the converted packets from numerous packet analyzers and from different types of security devices. In an embodiment, the event message collector 26 may receive security-type event messages from one or more security devices analyzing the security of the network 10 using other types of network information and/or other types of analysis. For example, network behavior analysis and wireless activity analysis are examples of other types of analysis.

The event message processor 28 processes the event messages based on predefined security policies and adjusts network security for the network 10 based on the result of the processing. As described above, the event messages may originate from numerous packet analyzers, from different types of security devices, and from security devices analyzing the security of the network 10 using other types of network information and/or other types of analysis. In an embodiment, the event message processor 28 sends security adjustment information to one or more network devices (FIG. 2) of the network 10.

In an embodiment, the packet analyzer 30 analyzes the converted packets to determine whether any of its rules are triggered to send a security-type event message to the event message collector 26 of the network manager 20. The rules are intended to detect malicious, harmful, or illegitimate activity. The packet analyzer 30 may look for patterns of activity pertaining to a single network device, or across multiple network devices, and is not limited to analyzing each converted packet in isolation. In an embodiment, the packet analyzer 30 utilizes a signature based intrusion detection system known as SNORT®. The sampled packets may be converted to various formats compatible with other types of packet analyzers and other types of security devices.

It should be understood that the network environment 100 may have other configurations. In an embodiment, the sampled packets may be sent from the network devices (FIG. 2) directly to the packet analyzer 30, instead of first passing through the network manager 20. That is, the packet analyzer 30 analyzes the sampled packets to determine whether any of its rules are triggered to send a security-type event message to the event message collector 26 of the network manager 20. In an embodiment, the network manager 20 and the packet analyzer 30 may communicate through the network 10 and connection 42. In an embodiment, the packet analyzer 30 and the network manager 20 may be applications running on a single computer.

Figure 1B:
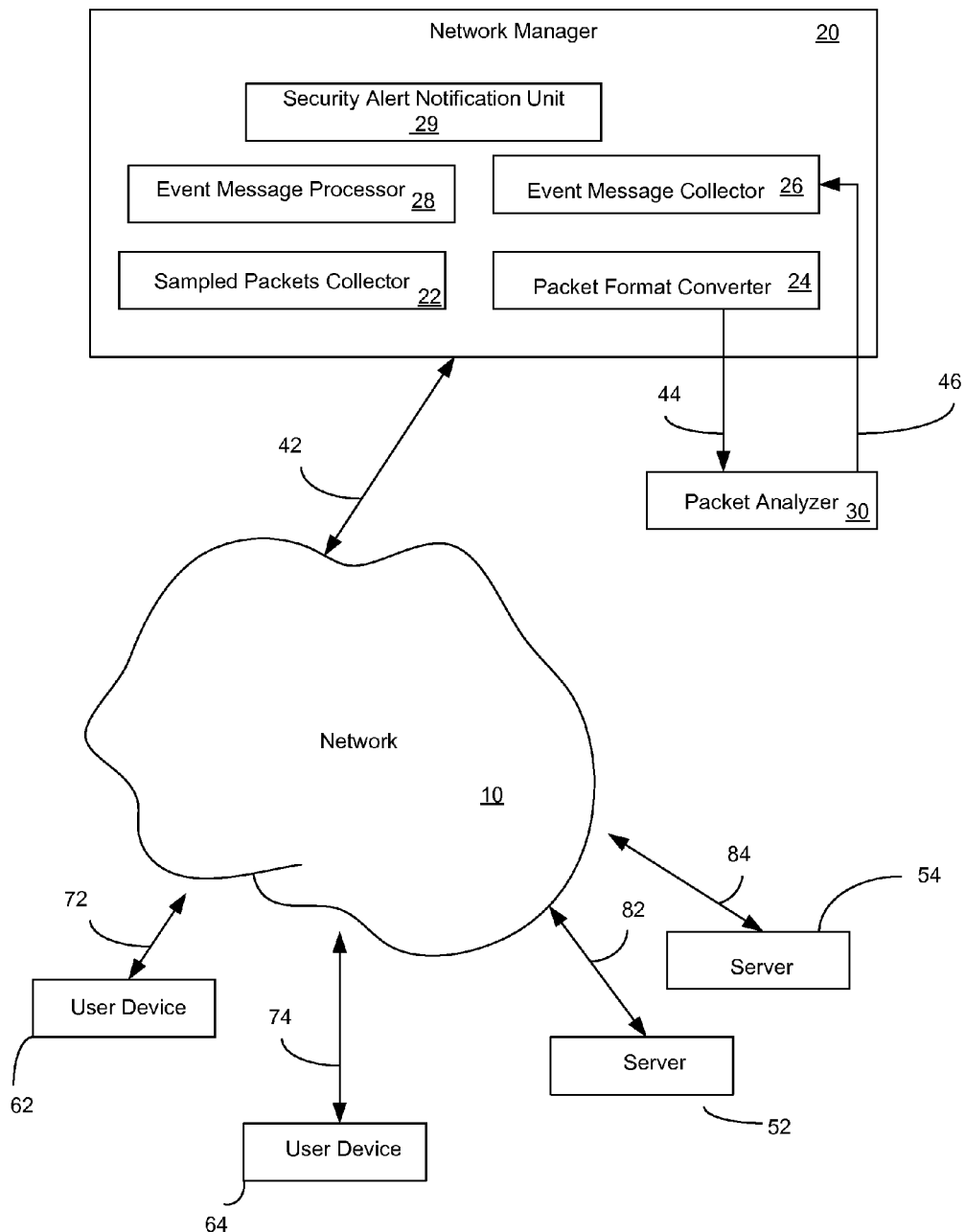
FIG. 1B illustrates another network environment in which to manage network security in accordance with various embodiments.

FIG. 1B illustrates another network environment 100 in which to manage network security in accordance with various embodiments. The description associated with FIG. 1A is applicable to the network environment 100 of FIG. 1B except as noted below.

As depicted in FIG. 1B, the network manager 20 further includes a security alert notification unit 29. The security alert notification unit 29 notifies a network administrator concerning adjustments to network security before the adjustments are made to allow the network administrator to approve or reject the adjustments to network security. That is, human intervention is made available. The notification may be by e-mail, pager, telephone, or any other manner. Moreover, the network administrator may provide new instructions regarding network security and adjustments to it. In an embodiment, the human intervention option may be controlled by a policy, such that approval from the network administrator may be omitted for certain types of security adjustments, or in certain areas of the network, or at certain times of the day, etc.

Figure 2:
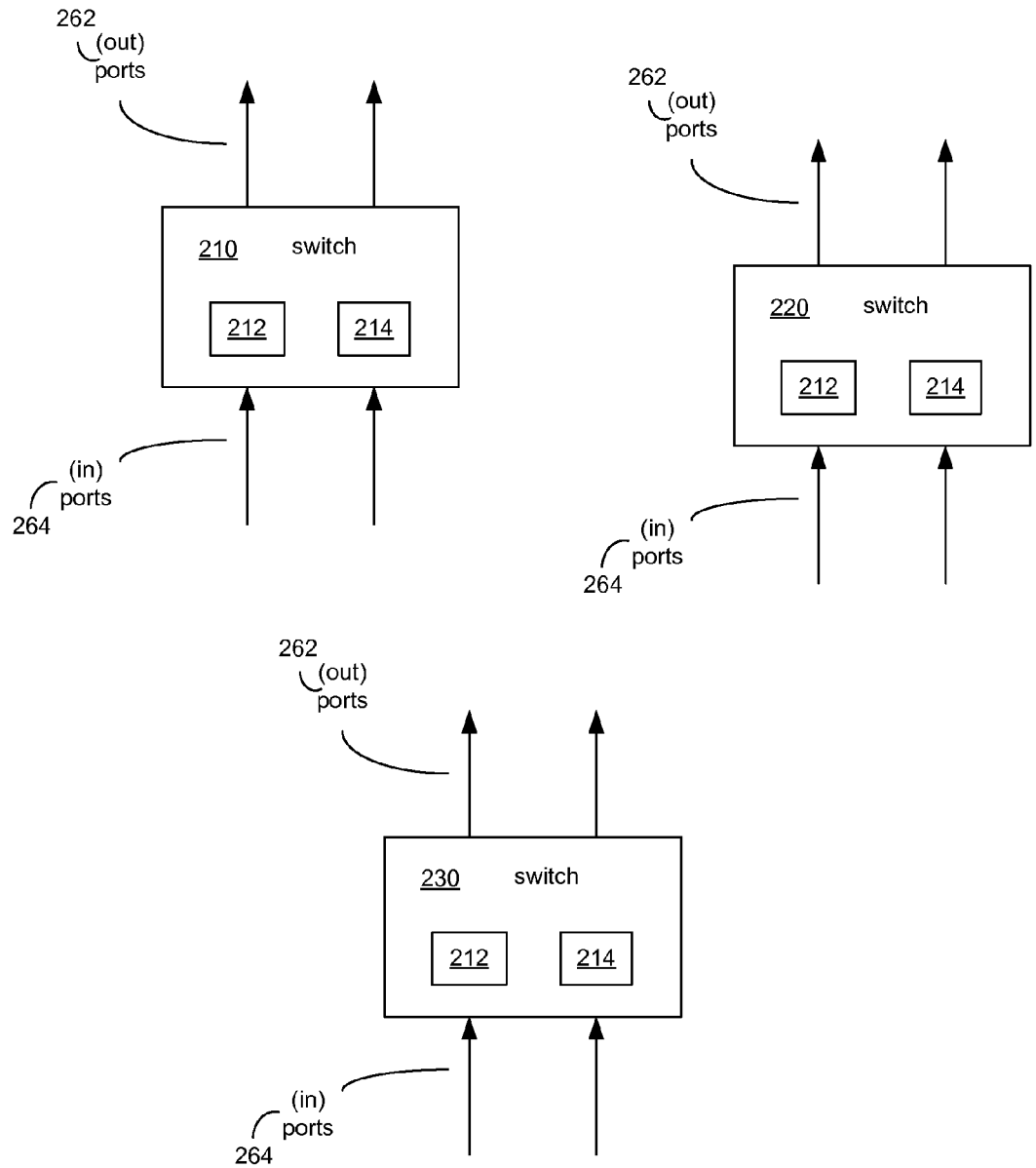
FIG. 2 illustrates a detailed view of the network of FIG. 1A in accordance with various embodiments.

FIG. 2 illustrates a detailed view of the network 10 of FIG. 1A in accordance with various embodiments. Although network switches 210, 220, and 230 are shown in FIG. 2, the network 10 may also have network routers, network traffic controllers, or any other type of wired or wireless network device. Moreover, the network security management technology described herein is applicable to network switches as well as to network routers, network traffic controllers, or any other type of wired or wireless network device.

The network switches 210, 220, and 230 may filter, forward to a destination address, or perform other action on the incoming network packet traffic. In an embodiment, each network switch 210, 220, and 230 may include a packet sampling unit 214, a security response unit 212, input ports 264, and output ports 262. In an embodiment, the ports 264 and 262 of a network switch 210, 220, and 230 may be bidirectional, though they are designated as having input or output roles for each packet transmission, reception, or forwarding operation. The roles may change for each packet that is processed. The input and output port for a given packet may also be the same in certain network configurations.

The packet sampling unit 214 samples network packet traffic to form sampled packets and sends the sampled packets to the network manager 20. In an embodiment, the packet sampling unit 214 utilizes a sampling technology for monitoring high-speed switched networks via packet capture that is compatible with an industry standard technology known as sFlow. The security response unit 212 receives security adjustment information from the network manager 20 and implements the security adjustment based on the security adjustment information. Examples of security adjustment information include adjustment to the packet sampling rate, access control list for input and/or output ports 264 and 262, disabling/enabling of input and/or output ports 264 and 262, and transmission rate limiting the input and/or output ports 264 and 262.

In addition to adjusting the packet sampling rate, there are other kinds of security monitoring adjustments that may be made, which might collectively be called targeted sampling or targeted monitoring. An example would be adjusting the settings on a network device to focus it on collecting more of the packets matching a particular pattern of traffic (e.g. with a particular source address, or to a particular destination address or of a particular packet type, or maybe even from a particular port on the network device). This might be done by sampling a subset of the matching packets or it might be done by sending all the matching packets to the network manager. The latter behavior may still be construable as sampling, since the matched packets would form a subset of the overall traffic passing through the network device. It may also be thought of as sampling with a sampling rate such that all matching packets are sampled.

An example of a sampling methodology is sFlow, which is described, for instance in RFC 3176, entitled "InMon Corporation's sFlow: A Method for Monitoring Traffic in Switched and Routed Networks", September 2001, by Phaal et al., and in the document, "sFlow Version 5", July 2004, by Phaal et al., which are incorporated by reference herein in their entirety.

Figure 3A:
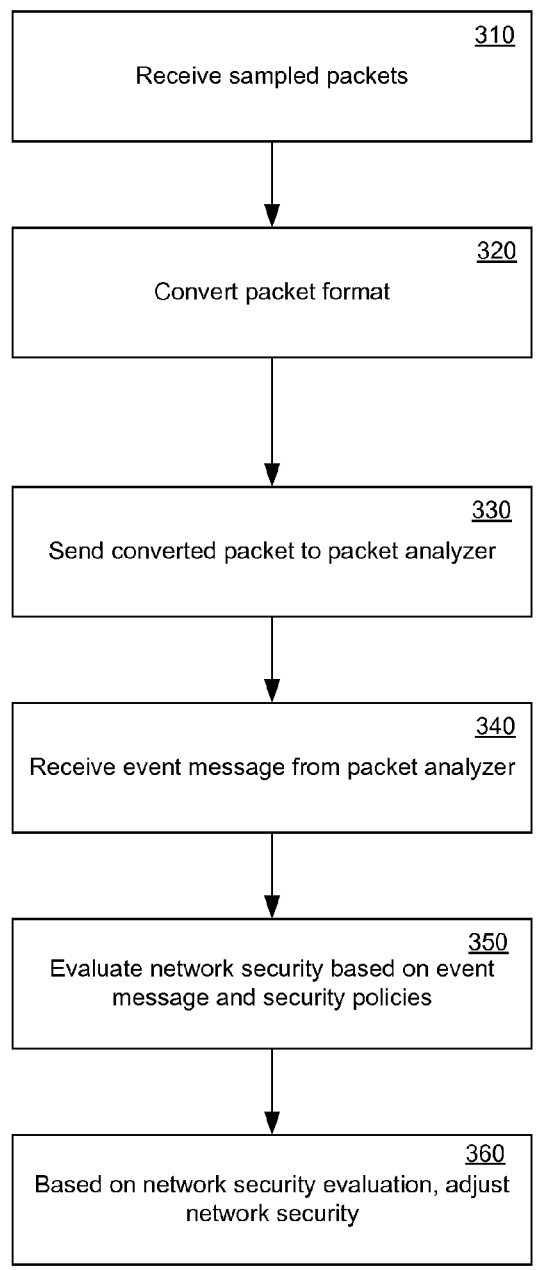
FIG. 3A illustrates a flowchart showing operation of network security management at a network manager in accordance with various embodiments.
Figure 3B:
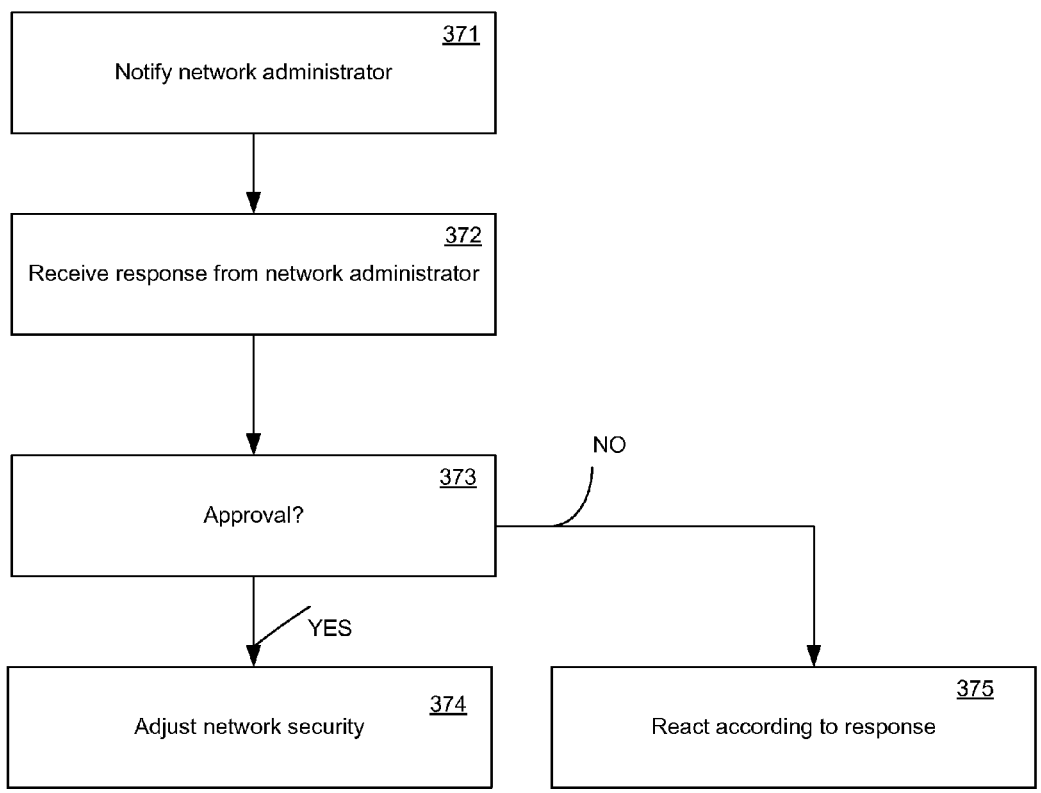
FIG. 3B illustrates a flowchart showing human intervention in network security management in accordance with various embodiments.
Figure 4:
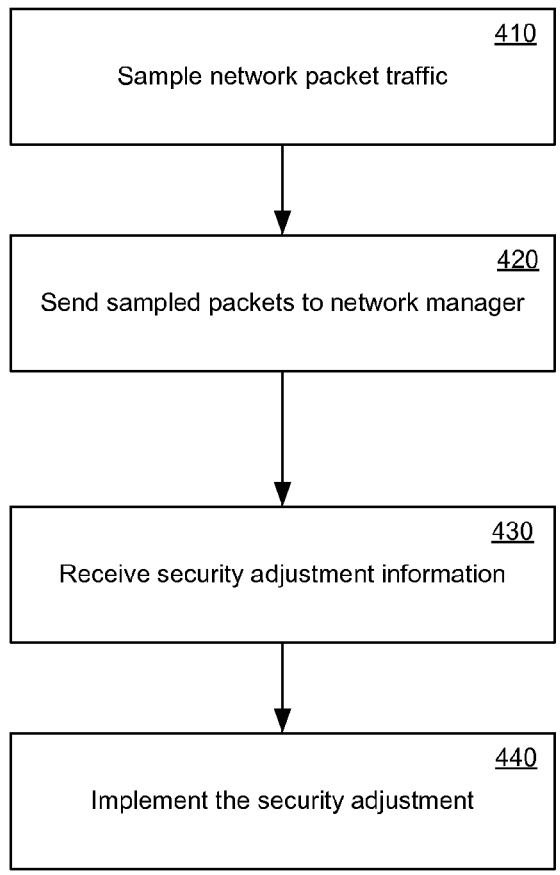
FIG. 4 illustrates a flowchart showing operation of network security management at a network device in accordance with various embodiments.

The following discussion sets forth in detail the operation of network security management. With reference to FIGS. 3A, 3B, and 4, flowcharts 300, 370, and 400 each illustrate example steps used by various embodiments of network security management. Flowcharts 300, 370, and 400 include processes that, in various embodiments, may be carried out under the control of computer-readable and computer-executable instructions. The computer-readable and computer-executable instructions may reside, for example, in data storage features such as computer usable memory, removable storage, and/or non-removable storage of the network manager 20 and packet analyzer 30 of FIG. 1A and the network switches 210-230 of FIG. 2. Although specific steps are disclosed in flowcharts 300, 370, and 400, such steps are examples. That is, embodiments are well suited to performing various other steps or variations of the steps recited in flowcharts 300, 370, and 400. It is appreciated that the steps in flowcharts 300, 370, and 400 may be performed in an order different than presented, and that not all of the steps in flowcharts 300, 370, and 400 may be performed.

FIG. 3A illustrates a flowchart 300 showing operation of network security management at a network manager 20 in accordance with various embodiments.

At block 310, the sampled packets collector 22 of the network manager 20 receives sampled packets via connection 42. The sampled packets represent packets being sampled from network packet traffic in at least one location in the network 10. In an embodiment, the locations are the network switches (e.g., 210-230 FIG. 2) of the network 10.

Continuing, at block 320, the packet format converter 24 of the network manager 20 converts the sampled packets into an appropriate format for analysis to form converted packets. In an embodiment, the packet format converter 24 converts the sampled packets into a PCAP (packet capture) file that may represent the network packets in a similar format to that used when they are transmitted through the network 10, and is used by various security devices such as packet analyzers.

At block 330, the packet format converter 24 sends the converted packets to the packet analyzer 30 via connection 44. The packet format converter 24 may send the converted packets to numerous packet analyzers. Additionally, the converted packets may be sent to different types of security devices. Some of these security devices may require the packet format converter 24 to perform different format conversions on the sampled packets.

Further, at block 340, the event message collector 26 of the network manager 20 receives a security-type event message from the packet analyzer 30 if the event message is generated by the packet analyzer 30 as a result of analysis of the converted packets. If the packet analyzer 30 receives sampled packets directly from one or more security devices, the event message is generated as a result of analysis of the sampled packets. The event message may indicate the network security reason the event message was created, classification of the network security reason, priority of the event message, source and destination addresses (e.g., IP addresses, MAC (media access control) addresses, etc.), port(s), protocols, etc. In an embodiment, the addresses, port, and protocol information is information obtained from the converted or sampled packets, and thus may be used to identify the network packet traffic to which the security-type event message pertains.

The event message collector 26 may receive event messages based on analysis of the converted packets and/or sampled packets from numerous packet analyzers and from different types of security devices. In an embodiment, the event message collector 26 may receive security-type event messages from one or more security devices analyzing the security of the network 10 using other types of network information and/or other types of analysis. For example, network behavior analysis and wireless activity analysis are examples of other types of analysis.

Moreover, at block 350, the event message processor 28 of the network manager 20 evaluates the network security based on the event message and predefined security policies. The event message may originate from numerous packet analyzers, from different types of security devices, and from security devices analyzing the security of the network 10 using other types of network information and/or other types of analysis.

At block 360, the event message processor 28 adjusts the network security of the network 10 based on the evaluation of the network security and sends security adjustment information to one or more network switches (e.g., 210, 220, and 230). Examples of security adjustment information include adjustment to the packet sampling rate, access control list for input and/or output ports 264 and 262, disabling/enabling of input and/or output ports 264 and 262, and transmission rate limiting the input and/or output ports 264 and 262. In an embodiment, adjusting the packet sampling rate may be done to provide more detailed sampling of a portion of the network packet traffic in order to improve the analysis that may be performed. The network switch(es) selected to receive the security adjustment information may be based on the location within the network topology of the source address that triggered the event message as well as predefined corrective actions associated with the classification of the event message. An Address Finder function may be utilized to identify the network switch(es) and port(s) which the source address of the packet which was sampled is using in the network 10. The source address information may be obtained from the event message. The Address Finder function may use a variety of methods to identify the network switch(es) such as querying discovery and topology information, forwarding addresses, ARP (address resolution protocol) cache etc. This provides the capability to deploy actions in real-time that directly remedy the root causes of the network security incidents (e.g., denial of service (DOS), viruses, threats, attacks, etc.).

FIG. 3B illustrates a flowchart 370 showing human intervention in network security management in accordance with various embodiments.

Before the event message processor 28 adjusts the network security of the network 10 based on the evaluation of the network security and sends security adjustment information to one or more network switches (e.g., 210, 220, and 230) as described in block 360 of FIG. 3A, the security alert notification unit 29 (FIG. 1B) notifies the network administrator concerning the proposed network security adjustments, at block 371. The notification may be by e-mail, pager, telephone, or any other manner.

Continuing, the security alert notification unit 29 receives a response from the network administrator concerning the proposed network security adjustments, at block 372. If the network administrator approves the proposed network security adjustments, at block 373, the event message processor 28 adjusts the network security of the network 10 and sends security adjustment information to one or more network switches (e.g., 210, 220, and 230), at block 374. Otherwise, at block 375, the event message processor 28 reacts as required by the response received from the network administrator. The network administrator may reject the proposed network security adjustments or may provide new instructions regarding network security and adjustments to it.

FIG. 4 illustrates a flowchart 400 showing operation of network security management at a network device in accordance with various embodiments.

At block 410, the packet sampling unit 214 of the network switch (e.g., 210, 220, and 230 of FIG. 2) samples network packet traffic in the network 10 to form sampled packets. Further, at block 420, the packet sampling unit 214 sends the sampled packets to the network manager 20. In an embodiment, the packet sampling unit 214 utilizes a sampling technology for monitoring high-speed switched networks via packet capture that is compatible with an industry standard technology known as sFlow. In an embodiment, the packet sampling unit 214 sends the sampled packets directly to a packet analyzer.

Further, at block 430, the security response unit 212 of the network switch (e.g., 210, 220, and 230 of FIG. 2) receives the security adjustment information from the network manager 20. Examples of security adjustment information include adjustment to the packet sampling rate, access control list for input and/or output ports 264 and 262, disabling/enabling of input and/or output ports 264 and 262, and transmission rate limiting the input and/or output ports 264 and 262. Moreover, at block 440, the security response unit 212 implements the security adjustment based on the security adjustment information.

As a result, this network security management technology achieves benefits such as reduction in complexity, reduction in cost, greater scalability, and greater adaptability. Moreover, a network-wide and closed-loop approach to managing network security is provided in a very cost effective manner and in a rapidly deployable manner and in an automated response manner to network security incidents (e.g., denial of service (DOS), viruses, threats, attacks, etc.). The closed-loop aspect refers to the fact that remedial action may be taken promptly to stop or mitigate the effects of the malicious, harmful, or illegitimate network activity, without a requirement for human intervention. In an embodiment, the option for human intervention (via some kind of notification) to approve or reject the action to be taken is provided.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method of managing network security, said method comprising:
receiving a plurality of sampled packets at a network security device from one or more network devices, wherein said plurality of sampled packets represent packets being sampled from network packet traffic in a network comprising said one or more network devices;
generating an event message from said network security device as a result of analysis of said plurality of sampled packets;
sending said event message to a second location configured for network security analysis;
evaluating at said second location said network security based on said event message and security policies; and
adjusting said network security at one of said one or more network devices based on said evaluation of said network security, wherein said network security device and said one or more network devices are a part of a closed loop that comprises a feedback path free of intermediate network access.

2. The method of claim 1, further comprising:
converting said plurality of sampled packets into an appropriate format for analysis at said network security device.

3. The method as recited in claim 1, wherein said adjusting said network security comprises:
sending security adjustment information from said second location to a network device.

4. The method as recited in claim 1, further comprising:
sending said plurality of sampled packets to a group including at least one security device; and
receiving a second event message from a second security device in said group as a result of analysis of said plurality of sampled packets.

5. The method as recited in claim 4, further comprising:
evaluating said network security based on said second event message from said second security device and said security policies; and
adjusting said network security based on said evaluation of said network security that is based on said second event message from said second security device and said security policies.

6. A network security system, comprising:
   a packet sampling unit configured for sampling network packet traffic at a network device to form a plurality of sampled packets;
   a network security device configured for receiving said plurality of sampled packets from said packet sampling unit;
   a network manager configured for receiving an event message from said network security device as a result of analysis of said plurality of sampled packets by said network security device and for evaluating said network security based on said event message; and
   a security response unit at said network device configured for receiving security adjusting information from said network manager and for implementing at said network device security adjustment based on said security adjusting information,
   wherein said security response unit and said network manager comprise a closed loop comprising a feedback path free of intermediate network access.

7. The network security system of claim 6, further comprising:
   a packet format converter for receiving said plurality of sampled packets and converting said plurality of sampled packets into an appropriate format for analysis to form a plurality of converted packets, and for sending said plurality of converted packets to said network security device.

8. The network security system of claim 6, wherein said network device comprises a switch.

9. The network security system of claim 6, wherein said network manager further comprises:
   an event message collector configured for receiving event messages based on analysis of said plurality of sampled packets from said network security device.

10. The network security system of claim 9, wherein said network manager is configured for receiving a second event message from a second security device configured for receiving said plurality of sampled packets and evaluating said network security based on said second event message.

11. The network security system of claim 10, wherein said security response adjusting information is based on second security adjusting information from said network manager.

12. A computer-readable non-transitory medium comprising computer-executable instructions for causing performance of a method of managing network security, said method comprising:
   receiving a plurality of sampled packets at a network security device from one or more network devices, wherein said plurality of sampled packets represent packets being sampled from network packet traffic in a network comprising said one or more network devices;
   generating an event message from said network security device as a result of analysis of said plurality of sampled packets;
   sending said event message to a second location configured for network security analysis;
   evaluating at said second location said network security based on said event message and security policies; and
   adjusting said network security at one of said one or more network devices based on said evaluation of said network security, wherein said network security device and said one or more network devices are a part of a closed loop that comprises a feedback path free of intermediate network access.

13. The computer-readable medium of claim 12, wherein said method further comprises:
   converting said plurality of sampled packets into an appropriate format for analysis at said network security device.

14. The computer-readable medium of claim 12, wherein said adjusting said network security in said method further comprises:
   sending security adjustment information from said second location to a network device.

15. The computer-readable medium of claim 12, wherein said method further comprises:
   sending said plurality of sampled packets to a group including at least one security device; and
   receiving a second event message from a second security device in said group as a result of analysis of said plurality of sampled packets.

16. The computer-readable medium of claim 15, wherein said method further comprises:
   evaluating said network security based on said second event message from said second security device and said security policies; and
   adjusting said network security based on said evaluation of said network security that is based on said second event message from said second security device and said security policies.

* * * * *